2,772,762

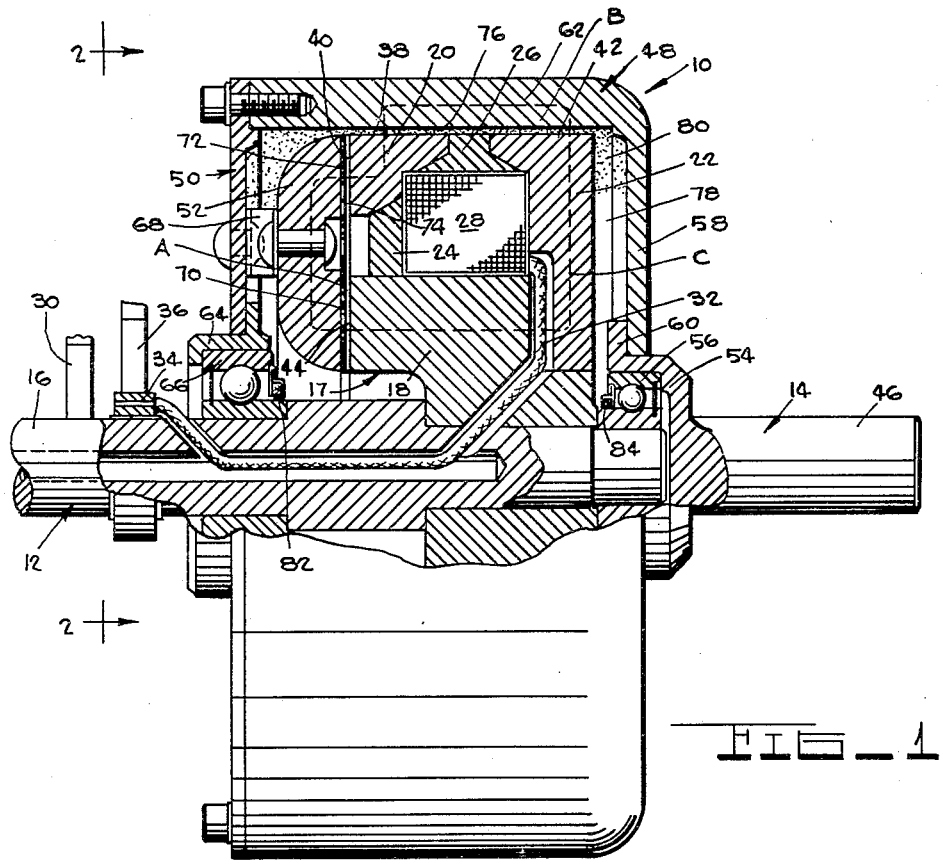
FIG_1
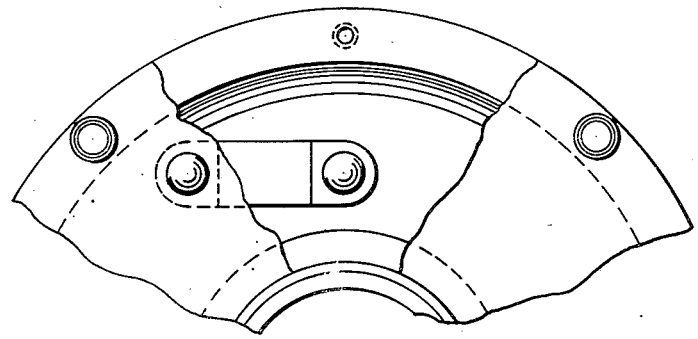
FIG_2
INVENTORS
REYNOLD F. GAMUNDI
GEORGE R. PIPES
BY
ATTORNEYS Dec. 4, 1956     R. F. GAMUNDI ET AL     2,772,762
MAGNETIC DRIVE
Filed Feb. 17, 1953     2 Sheets-Sheet 2
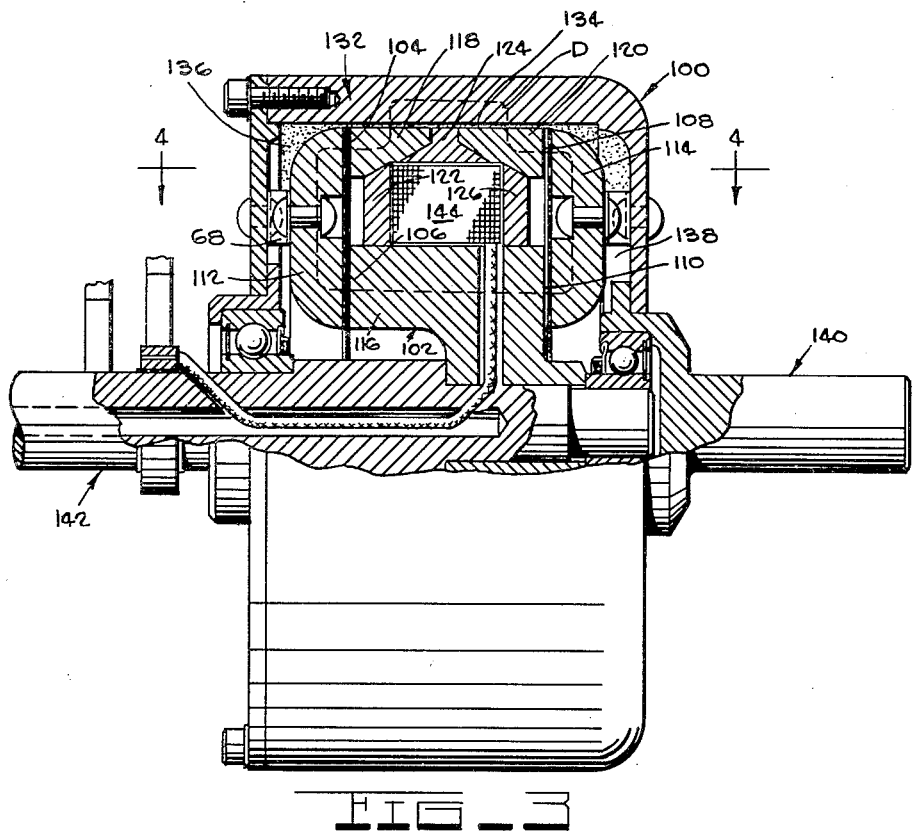
FIG_3
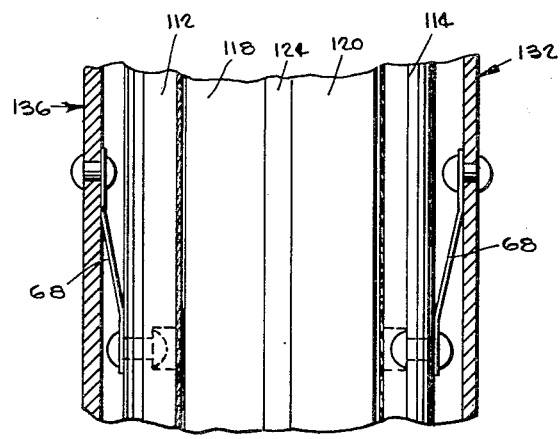
FIG_4
INVENTORS
REYNOLD F. GAMUNDI
GEORGE R. PIPES
BY
*McDonald & Feagno*
ATTORNEYS United States Patent Office 2,772,762
Patented Dec. 4, 1956

MAGNETIC DRIVE

Reynold F. Gamundi and George R. Pipes, Mayfield Heights, Ohio, assignors to Eaton Manufacturing Company, Cleveland, Ohio, a corporation of Ohio Application February 17, 1953, Serial No. 337,404

10 Claims. (Cl. 192—21.5)

This invention relates to magnetic drives or clutches and more paricularly to a combination fixed and closable air gap fluid magnetic material electromagnetic power transmitting mechanism.

Broadly the invention comprehends the provision of an electromagnetic drive incorporating combination fixed and closable air gap fluid magnetic material clutching means providing for a maximum torque output for a given size. Through the use of a single electromagnetic coil wherein the magnetic circuit thereof is common to a closable air gap clutch means and a fixed air gap clutch means, both utilizing fluid magnetic material as a power transmitting medium between relatively rotatable input and output members of a drive in which a maximum space efficiency is obtainable for a given torque transmission.

Among the objects of the invention is the provision of a combination fixed and closable air gap fluid magnetic material electromagnetic power transmitting drive, that:

a. Is simple and economical to construct;

b. Employs a single magnetic coil and single circuit therefor for the actuation of the combination fixed and closable gap means of the drive;

c. Delivers a maximum torque for a minimum space, weight and size; and d. Includes a relatively rotatable member, one member of which has a radial portion thereof engageable with an element of the other member for clutching engagement therewith and a cylindrical portion thereof associated with another element of the other member for clutching relation therewith.

Other objects and advantages of the invention will appear from the following description taken in connection with the drawings forming a part of the specification, and in which:

Fig. 1 is a partly broken away cross-sectional view of a combination fixed and variable air gap fluid magnetic material drive;

Fig. 2 is a fragmentary portion of a partly broken away view taken substantially along lines 2—2 of Fig. 1;

Fig. 3 is a partly broken away cross-sectional view of a combination fixed and variable air gap fluid magnetic material drive slightly modified from that of Fig. 1; and Fig. 4 is a fragmentary portion of a view taken substantially along lines 4—4 of Fig. 3.

Similar reference characters indicate corresponding parts throughout the several views of the drawings.

Referring to the drawings for more specific details of the invention 10 represents generally a combination fixed air gap and variable air gap fluid magnetic material clutch or drive comprising an output or driven member 12 and a cooperable input or driving member 14.

Output member 12 includes an output shaft 16 and a rotor 17 fixedly secured to the shaft 16. Rotor 17 includes magnetic material rings 18, 20 and 22 and nonmagnetic material rings 24 and 26 arranged in coaxial predetermined association to one another providing an annular opening centrally thereof in which is positioned an electromagnetic coil 28. Coil 28 has one end, not shown, grounded by way of ring 18, and shaft 16 to brush 30 whereas the opposite end of the coil is supplied current by way of electrical conduit 32 having connection with collector ring 34, which ring is in turn engaged by brush 36 supplied current from a suitable source, not shown. Ring 20 is provided with an outer cylindrical surface 38 and an annular radially extended surface 40 and is spaced axially from ring 22 with ring 24 interposed therebetween and is spaced radially from ring 18 with ring 26 interposed therebetween, the purpose of which will hereinafter appear. Ring 22 is provided with a cylindrical surface 42 of like diameter to surface 38 on ring 20 and ring 18 is provided with a radially extended surface 44 lying in the same plane as radially extended surface 40 on ring 20.

Input member 14 includes an input shaft 46, a drum member 48, an end cover plate 50 and an armature or clutch plate 52. Shaft 46 is arranged coaxially with shaft 16 and has a hollow cylindrical end 54 thereof journalled on a bearing 56 which is mounted on one end of shaft 16 with the end of the shaft received telescopically within the hollow end of shaft 46. An inner portion of radial annular wall 58 of drum 48 is fixedly secured to a radial flange 60 of shaft 46 for rotation therewith whereas cylindrical wall 62 of the drum integral with radial wall 58 thereof has an outer annular portion of end cover plate 50 fixedly secured at its open axial end. An inner annular portion of plate 50 is secured to an annular hub 64 which hub is in turn journalled on a bearing 66 mounted on shaft 16 axially spaced from bearing 56 on the opposite side of rotor 17 from bearing 56. Clutch plate 52 is secured for rotation with cover plate 50 by way of a plurality of resilient thrust straps 68 mounted between the cover plate and clutch plate serving to transmit the rotation of the cover plate therethrough to the clutch plate while simultaneously permitting of the movement of the clutch plate axially relative to the cover plate.

Clutch plate 52 is annular in form and has a substantially C-shaped cross-section providing radially extended annular surfaces 70 and 72 complementary respectively to the annular surfaces 40 and 44 of the rotor and normally radially spaced therefrom as shown by Fig. 1. Plate 52 is of magnetic material and is preferably adapted to have fixedly secured thereto magnetic lining 74, which lining is adapted to have cooperative association with the annular surfaces 40 and 44 of the rotor. Air space or gap A provided between the clutch plate 52 and annular surfaces 40 and 44 of the rotor is the closable air gap of drive 10 in that the axial movement of the plate 52 serves to close the gap in its axial movement into engagement with the rotor from its position shown in Fig. 1.

Cylindrical wall 62 of the drum 48 is provided internally thereof with a smooth cylindrical surface 76 radially spaced a predetermined distance from the cylindrical surfaces 38 and 42 of the respective rings 20 and 22. This radial spacing or air gap "B" is the fixed air gap of drive 10 and remains constant for all operations of the drive.

The drum 48 and end plate cover 50 structure together with the bearings 56 and 66 form an enclosure for the rotor 17 so as to provide for the retention in annular chamber 78 of the drum and cover plate of fluid magnetic material 80. Seals 82 and 84 are provided for the respective bearings 56 and 66 for inhibiting the passage of the magnetic material into the bearings and thus safeguard and prolong the life of the bearings.

The fluid magnetic material 78 can be of any suitable type such as that defined in Howard J. Findley Patent No. 2,519,449 or Martin P. Winther Patent No. 2,525,571. The fluid magnetic material employed by the patented structures is merely illustrative and should not be taken as a limitation relative to the present structure.

The magnetic lining 74 is preferably to be of the general type disclosed and claimed by Anthony Winther Patent No. 2,580,869 although most any suitable magnetic permeable lining will suffice.

In a normal operation of clutch or drive 10 with a suitable quantity of fluid magnetic material in chamber 78, an energization of coil 28 results in the fluid magnetic material taking up a position in the air gaps A and B through the establishing of a magnetic circuit having a flux path generally designated by the dotted lines C of Fig. 1. With the establishment of the magnetic circuit the clutch plate is attracted by the rotor such that the magnetic lining is moved axially into substantially friction engaging relation with the surfaces 38 and 42 of the rotor, separated therefrom solely by the layer or film of magnetic material drawn therebetween operative as a bonding and power transmitting medium for the effective transmission of torque between the rotor and clutch plate. Simultaneously therewith the magnetic material as it assumes its position in air gap B, it forms, through the action of the magnetic lines of force between the rotor and drum, substantially solid links or chains serving to transmit torque between the rotor and drum.

As a result of the transmission or torque between the rotor and the drum and clutch plate elements of the output member, a maximum amount of torque transmission is possible for a given space and size.

Figs. 3 and 4 illustrate a modified clutch 100 from that of clutch 10 of Figs. 1 and 2, primarily in the provision of two variable air gap clutching means as compared to the single closable air gap clutching means of Figs. 1 and 2. Clutch 100 includes a rotor 102 which differs from rotor 17 of clutch 10 in so providing radially extended annular surfaces 104, 106, 108 and 110 on axial opposite ends thereof so as to accommodate cooperative association thereof with clutch plates 112 and 114.

Rotor 102 comprises coaxial magnetic rings 116, 118 and 120 and non-magnetic rings 122, 124 and 126 with ring 122 radially interposed between rings 116 and 118 so as to space surface 104 on ring 116 from surface 106 on ring 118. Ring 126 is radially interposed between rings 116 and 120 so as to space surface 108 on ring 116 from surface 110 and ring 120. Ring 124 similarly to ring 24 of clutch 10 is axially interposed between rings 118 and 120 so as to axially space cylindrical surfaces 128 and 130 of the respective rings 118 and 120 from one another. Drum 132 of clutch 100 is provided with an inner smooth cylindrical surface 134 radially spaced from the cylindrical surfaces 128 and 130 of the rotor for cooperative association therewith.

A suitable fluid magnetic material 136 of like nature as may be employed in clutch 10 is utilized in annular chamber 138 provided between input member 140 of which the drum forms a part of and the output member 142 of which the rotor forms a part of. Current is appropriately supplied to a coil 144 secured in an assembly of rings 116, 118, 120, 122, 124 and 126 of the rotor providing for the establishing of a magnetic circuit having a flux path generally designated by dotted lines D of Fig. 3. With the establishment of the magnetic circuit the magnetic material serves to couple the drum and rotor together whereas the clutch plate as suitably secured for rotation with the input member 140 and axially movable relative thereto are attracted toward the rotor for coupling relation therewith. As such, these clutching means are provided for transmitting torque between the input member 140 and output member 142.

Although clutches 10 and 100 have been disclosed and defined relative to the provision of fluid magnetic material between the elements of the closable air gap clutching means thereof said clutches are effectively operable without said fluid magnetic material provided between the elements of the variable air gap clutching means.

Although as disclosed the relation of input to output member of clutches 10 and 100 is specific, this is merely illustrative since a reversal of parts can be made without departing from the basic premise presented; that of a clutch or drive capable of transmitting a maximum amount of torque for a given size and space. Various other modifications of structure can be made and will be apparent to those skilled in the art which will in no way detract from the basic ideas herein shown and defined. Accordingly, the invention is to be interpreted in the light thereof as expressed by the appended claims.

What we claim is:

1. A clutch comprising relatively rotatable magnetic members, means for generating a single flux field between the members, portions of said rotatable members having a fixed air gap therebetween, magnetic means supported for rotation with one of the rotatable members and relatively movable toward and away from another portion of the other member, and fluid magnetic material in the fixed air gap, said generated flux field passing between the members across the fixed air gap and between the means supported for relative movement toward and away from the one portion of the other member, and the one portion of the other member, in a single continuous path providing for a dual coupling action between the members.

2. A clutch according to claim 1 wherein fluid magnetic material is provided between the means supported for rotation and the portion of the other member to which it is moveable toward and away from.

3. A clutch comprising relatively rotatable first and second magnetic members, a circumferential portion on said first member having a fixed air gap spaced relative from a circumferential portion of said second member with said first member constituting a housing enclosing the second member in sealed relation therewithin, magnetic means supported on said first member internally thereof for rotation therewith and relatively moveable toward and away from a radially extended annular portion of said second member, means for generating a single flux field between the members that bridges the portions of the members spaced from one another, and the means supported for rotation and the portion of the member toward and away from which it is relatively moveable, and fluid magnetic material internally of the housing in the fixed air gap between the portions of the members and between the means supported for rotation and the portion of the member toward and away from which it is relatively moveable.

4. An electromagnetic drive comprising relatively rotatable magnetic members including an electromagnetic fixed air gap clutching means and an electromagnetic closable air gap clutching means therebetween, means for generating a singular flux field bridging the respective fixed and variable air gap clutching means and fluid magnetic material in the air gap of the fixed air gap clutching means, said closable air gap clutching means including an armature having radially extended and spaced clutch surfaces and a field member axially spaced therefrom including radially extended and spaced annular poles adapted to engage the armature clutch surfaces upon the energization of the drive.

5. A drive according to claim 4 wherein fluid magnetic material is provided in the air gap of the closable air gap clutching means.

6. An electromagnetic drive comprising relatively rotatable first and second magnetic members, cooperative cylindrical portions of said members being fixedly spaced from one another and said first member constituting a housing enclosing said second member in sealing relation therewith, magnetic means supported on said first member for rotation therewith and having a radial face portion being moveable relatively toward and away from a complementary radial face portion of said second member, an energizable magnetic coil on said second member for producing a flux field bridging the spaced apart portions of the members and the means supported on said first member and the associated portion on said second member and fluid magnetic material between the spaced apart portions of the members.

7. An electromagnetic drive comprising a rotatable housing member including integral radially and axially extended flanges, a rotor cooperable therewith and enclosed therein including a cylindrical surfaced portion radially spaced from the internal periphery of the axially extended flange, and radially extended surface portions, an electromagnetic coil fixedly mounted in the rotor, an armature, supported on a radial flange of the rotatable member internally of the member for rotation therewith and moveable axially relative thereto toward and away from the rotor, having radially extended surfaces substantially complementary to the radially extended surface portions of the rotor, said coil upon the energization thereof producing a single flux field between the cylindrical surfaced portion of the rotor and the axially extended flange of the rotatable member and between the radially extended surface portions of the rotor and the radially extended surfaces of the armature, and fluid magnetic material between the cylindrical surface portion of the rotor and internal periphery of the axially extended flange.

8. A drive according to claim 7 wherein fluid magnetic material is provided between the radially extended surfaces of the rotor and armature.

9. An electromagnetic drive comprising relatively rotatable magnetic members, one of said members including a drum having a cylindrical surface and a magnetic armature supported for rotation with the drum and axially movable relative thereto, said armature having radially extended surface means, said other magnetic member including a field member having axially spaced cylindrical surfaced poles radially spaced from the cylindrical surface of the drum, and radially spaced radially extended poles axially spaced from the radially extended surface means of the armature, and means for generating a single flux field bridging the space between the drum and field member and between the field member and armature by way of the poles of the field member.

10. An electromagnetic drive according to claim 9 wherein the cylindrical surface of the drum is internal and the field member is inward radially spaced from the drum.

References Cited in the file of this patent

UNITED STATES PATENTS

| | | |
|---|---|---|
| 2,499,036 | Plantet | Feb. 28, 1950 |
| 2,519,449 | Findley | Aug. 22, 1950 |
| 2,580,869 | Winther | Jan. 1, 1952 |

FOREIGN PATENTS

| | | |
|---|---|---|
| 251,974 | Switzerland | Sept. 16, 1948 |